(12) United States Patent
Mizoguchi et al.

(10) Patent No.: US 8,089,673 B2
(45) Date of Patent: Jan. 3, 2012

(54) ACTUATOR, OPTICAL SCANNER, AND IMAGE FORMING APPARATUS

(75) Inventors: Yasushi Mizoguchi, Chino (JP); Makiko Nakamura, Chino (JP)

(73) Assignee: Seiko Epson Corporation (JP)

( * ) Notice: Subject to any disclaimer, the term of this patent is extended or adjusted under 35 U.S.C. 154(b) by 331 days.

(21) Appl. No.: 12/546,024

(22) Filed: Aug. 24, 2009

(65) Prior Publication Data

US 2010/0046052 A1     Feb. 25, 2010

(30) Foreign Application Priority Data

Aug. 25, 2008  (JP) ................................. 2008-215751
Jul. 16, 2009  (JP) ................................. 2009-167625

(51) Int. Cl.
*G02B 26/08* (2006.01)
*G02B 26/10* (2006.01)
*G02B 26/12* (2006.01)

(52) U.S. Cl. .................................. 359/202.1; 359/200.7
(58) Field of Classification Search ............... 359/199.3, 359/200.7, 202.1, 212.1, 290; 310/36
See application file for complete search history.

(56) References Cited

U.S. PATENT DOCUMENTS

| | | | |
|---|---|---|---|
| 5,912,608 A | 6/1999 | Asada | |
| 2004/0105139 A1* | 6/2004 | Hirose et al. | ............. 359/226 |
| 2008/0218823 A1 | 9/2008 | Mizoguchi | |
| 2008/0218832 A1 | 9/2008 | Mizoguchi | |
| 2008/0226312 A1 | 9/2008 | Mizoguchi et al. | |

FOREIGN PATENT DOCUMENTS

| | | |
|---|---|---|
| JP | 08-322227 | 12/1996 |
| JP | 2003-207737 | 7/2003 |
| JP | 2005-181576 | 7/2005 |
| JP | 2008-170654 | 7/2008 |
| JP | 2008-216597 | 9/2008 |
| JP | 2008-228436 | 9/2008 |
| JP | 2008-228437 | 9/2008 |
| JP | 2008-228444 | 9/2008 |
| JP | 4232834 | 12/2008 |
| JP | 4232835 | 12/2008 |

* cited by examiner

*Primary Examiner* — Stephone Allen
*Assistant Examiner* — Kimberly N Kakalec
(74) *Attorney, Agent, or Firm* — Harness, Dickey & Pierce, P.L.C.

(57) ABSTRACT

An actuator includes: a frame; first members at each end of the frame along a first axis making the frame rotatable thereabout; second members supporting each end of a movable plate against the frame along a second axis making the movable plate rotatable thereabout; first magnets with poles interposing the first axis; a second magnet with poles interposing the first axis; a coil generating a magnetic force acting on the first and second magnets; and a voltage source applying a voltage to the coil. The first and second magnets have an angle of 30-60 degrees to the first axis, and identical magnetic pole directions. The voltage source includes first and second voltage generators generating first and second voltages of first and second frequencies, and a voltage superimposer. The movable plate is rotated about the first and second axes at the first and second frequencies by the superimposed voltages.

8 Claims, 5 Drawing Sheets

ACTUATOR, OPTICAL SCANNER, AND IMAGE FORMING APPARATUS

BACKGROUND

1. Technical Field

The present invention relates to an actuator, an optical scanner, and an image forming apparatus.

2. Related Art

Optical deflectors intended for application to equipment such as displays and printers using laser beams are required to provide faster scanning. However, improvement in the performances of polygon mirrors or galvano-mirrors used today is limited. Expected now as an alternative optical deflector is a mirror device that is fabricated by processing a silicon substrate using micro electro mechanical systems (MEMS). An MEMS mirror is driven at a high resonance frequency and thus allows formation of high-resolution images.

For example, an optical scanner of equipment such as a printer that performs drawing by optical beam scanning, JP-A-8-322227, as a first related-art example, discloses an actuator that performs two-dimensional light beam scanning.

The actuator disclosed in the first related-art example includes a semiconductor substrate, drive coils, and static magnetic field generating means. The semiconductor substrate has a movable portion and an axial support portion integrally formed thereto. The movable portion includes a frame like outer movable plate and an inner movable plate located within the outer movable plate. The axial support portion has first torsion bars for axially supporting the outer movable plate so as to enable the outer movable plate to swing, and second torsion bars that are orthogonal to the first torsion bars in its axial direction and axially support the inner movable plate so as to enable the inner movable plate to swing. The drive coils are respectively provided on peripheral portions of the outer movable plate and inner movable plate. The static magnetic field generating means applies a static magnetic force to the drive coils. In the actuator, the movable portion is driven by a magnetic field produced by a current flowing through the drive coils, and that one pair of the static magnetic field generating means is provided on one diagonal line of the movable portion so as to face the movable portion.

However, since the drive coils are provided on the movable plate in the actuator disclosed in the first related-art example, the movable plate may be bent by the heat of the coils. Also, since the pair of static magnetic field generating means is provided facing each other with the movable portion therebetween, it is difficult to downsize the apparatus. Moreover, since each of the drive coils is provided on each of the outer and inner movable plates, it is difficult to reduce costs.

SUMMARY

An advantage of the invention is to provide an actuator, an optical scanner, and an image forming apparatus which include a movable plate that is rotatable about a first axis and a second axis orthogonal to the first axis, while reducing the size and costs of the apparatus.

According to a first aspect of the invention, an actuator includes: a frame-shaped member; a pair of first axis members, each first axis member being provided at one of corresponding ends of the frame-shaped member in a direction along a first axis so as to make the frame-shaped member rotatable about the first axis; a movable plate provided within the frame-shaped member; a pair of second axis members supporting the movable plate against the frame-shaped member, each second axis member being provided at one of corresponding ends of the movable plate in a direction along a second axis so as to make the movable plate rotatable about the second axis that is orthogonal to the first axis; at least two first permanent magnets provided to the frame-shaped member such that the first axis is interposed between both poles of each of the first permanent magnets; a second permanent magnet provided to the movable plate such that the first axis is interposed between both poles of the second permanent magnet; a coil facing the frame-shaped member and generating a magnetic force that acts on the first and second permanent magnets upon receipt of a voltage; and a voltage applying unit applying the voltage to the coil. In the actuator, each of the first permanent magnets and the second permanent magnet are disposed so as to have an angle θ of 30<θ<60 degrees to the first axis and are disposed such that magnetic pole directions of the first and second permanent magnets are identical. The voltage applying unit includes a first voltage generating part generating a first voltage of a first frequency, a second voltage generating part generating a second voltage of a second frequency different from the first frequency, and a voltage superimposing part superimposing the first and second voltages. The movable plate is rotated about the first axis at the first frequency and about the second axis at the second frequency by application of a voltage superimposed by the voltage superimposing part to the coil.

In this case, by applying the voltage obtained by superimposing the first and second voltages, the movable plate may be rotated about the first and second axes X and Y while reducing the size and costs of the apparatus. Also, since two or more first permanent magnets and the second permanent magnet are provided, a large drive force may be attained with a fewer number of coils even though the structure is small and simple. Accordingly, it is possible to increase the scan angle of the resonance systems and to perform high-speed scan at the same time.

It is preferable that one end of each first permanent magnet be disposed at a coupling portion coupling the second axis member with the frame-shaped member.

In this case, the movable plate may be efficiently rotated about the second axis.

It is preferable that the second permanent magnet be disposed such that the second axis is interposed between both poles of the second permanent magnet.

In this case, a large drive force for rotating the movable plate about the second axis may be attained. Accordingly, it is possible to increase the scan angle of the resonance system and to perform high-speed scan at the same time.

It is preferable that L sin θ>0.5d, where L represents a length of the first permanent magnets in the magnetic pole direction, and d represents a length of the frame-shaped member in a direction perpendicular to the first axis.

In this case, because the first axis is interposed between the both poles of each first permanent magnet, the frame-shaped member and the movable plate may be efficiently rotated about the first axis. If L sin θ is equal to or less than 0.5d, however, both poles of each first permanent magnet are disposed in one of the two regions divided by the first X. In this situation, a rotational torque that acts on the first permanent magnets by magnetic fields generated by the coil becomes a reverse-direction rotation force in the N pole side and S pole side with respect to the axis X. Therefore, the rotational torque acting on the first permanent magnets decreases significantly as a whole, and rotational efficiency of the frame-shaped member and the movable plate decreases.

It is preferable that the second frequency be substantially equal to a resonance frequency of a second resonance system that includes the second permanent magnet, the movable plate, and the pair of second axis members and that uses the second axis members as a second rotation axis, and that the first frequency be different from a resonance frequency of a first resonance system that includes the second permanent magnet, the movable plate, the pair of second axis members, the first permanent magnets, the frame-shaped member, and the pair of first axis members and that uses the first axis members as a first rotation axis.

In this case, the movable plate may be rotated about the first and second axes very smoothly.

It is preferable that the second frequency be higher than the first frequency.

In this case, the movable plate may be more steadily and smoothly rotated about the first axis at the frequency of the first voltage and, at the same time, about the second axis at the frequency of the second voltage.

According to a second aspect of the invention, an optical scanner includes: a frame-shaped member; a pair of first axis members, each first axis member being provided at one of corresponding ends of the frame-shaped member in a direction along a first axis of the frame-shaped member so as to make the frame-shaped member rotatable about the first axis; a movable plate provided within the frame-shaped member and including a light reflection part having light reflectivity; a pair of second axis members supporting the movable plate against the frame-shaped member, each second axis member being provided at one of corresponding ends of the movable plate in a direction along a second axis so as to make the movable plate rotatable about the second axis that is orthogonal to the first axis; at least two first permanent magnets provided to the frame-shaped member such that the first axis is interposed between both poles of each of the first permanent magnets; a second permanent magnet provided to the movable plate such that the first axis is interposed between both poles of the second permanent magnet; a coil facing the frame-shaped member and generating a magnetic force that acts on the first and second permanent magnets upon receipt of a voltage; and a voltage applying unit applying the voltage to the coil. In the scanner, each of the first permanent magnets and the second permanent magnet are disposed so as to have an angle θ of 30<θ<60 degrees to the first axis and are disposed such that magnetic pole directions of the first and second permanent magnets are identical. The voltage applying unit includes a first voltage generating part generating a first voltage of a first frequency, a second voltage generating part generating a second voltage of a second frequency different from the first frequency, and a voltage superimposing part superimposing the first and second voltages. The movable plate is rotated about the first axis at the first frequency and about the second axis at the second frequency by application of a voltage superimposed by the voltage superimposing part to the coil.

In this case, through application of the voltage obtained by superimposing the first and second voltages, the movable plate may be rotated about the first axis and about the second axis orthogonal to the first axis, while reducing the size and costs of the apparatus. Also, because two or more first permanent magnets and the second permanent magnet are provided, a large drive force may be attained with a fewer number of coils even though the structure is small and simple. Accordingly, it is possible to increase the scan angle of the resonance systems and to perform high-speed scan at the same time.

According to a third aspect of the invention, an image forming apparatus includes the optical scanner according to the second aspect of the invention, in that the movable plate is rotated so as to perform two-dimensional scanning of light reflected by the light reflection part and to form an image on an object.

In this case, while reducing the size and costs of the apparatus, the movable plate may be rotated about the first axis and the second axis orthogonal to the first axis so that light beams are two-dimensionally scanned to thereby form images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the drawings.

First Embodiment

Figure 1:
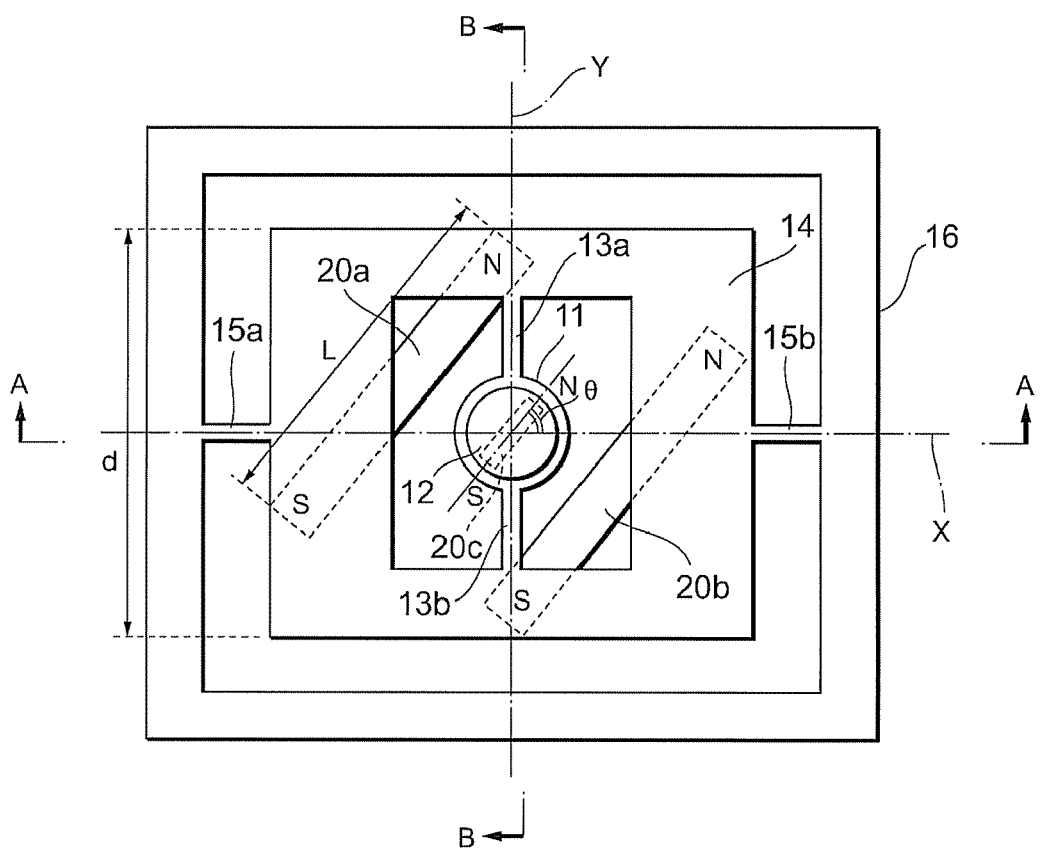
FIG. 1 is a plan view of the structure of an optical scanner (actuator) according to a first embodiment of the invention.
Figure 2:
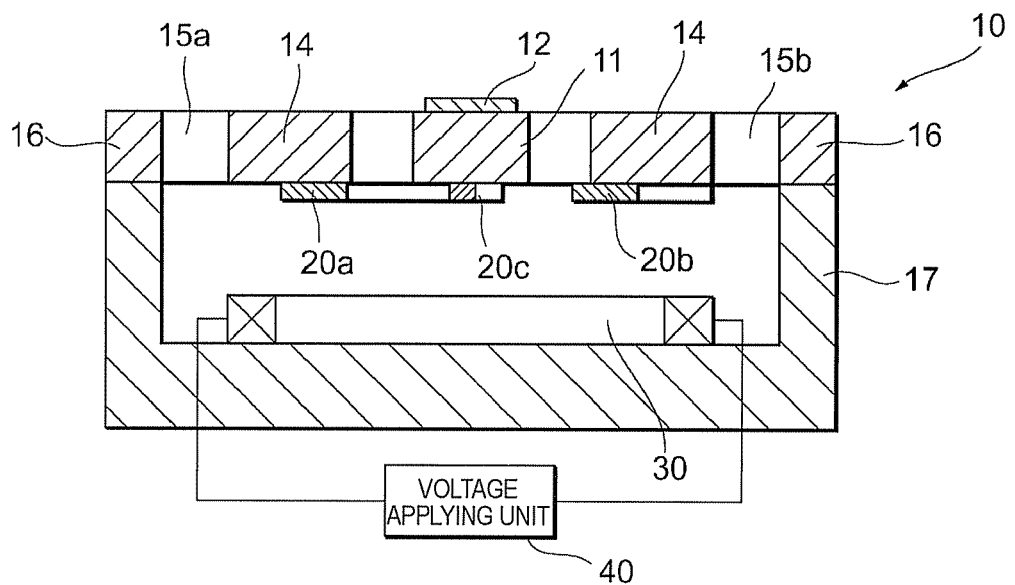
FIG. 2 is a sectional view taken on a line A-A of FIG. 1.
Figure 3:
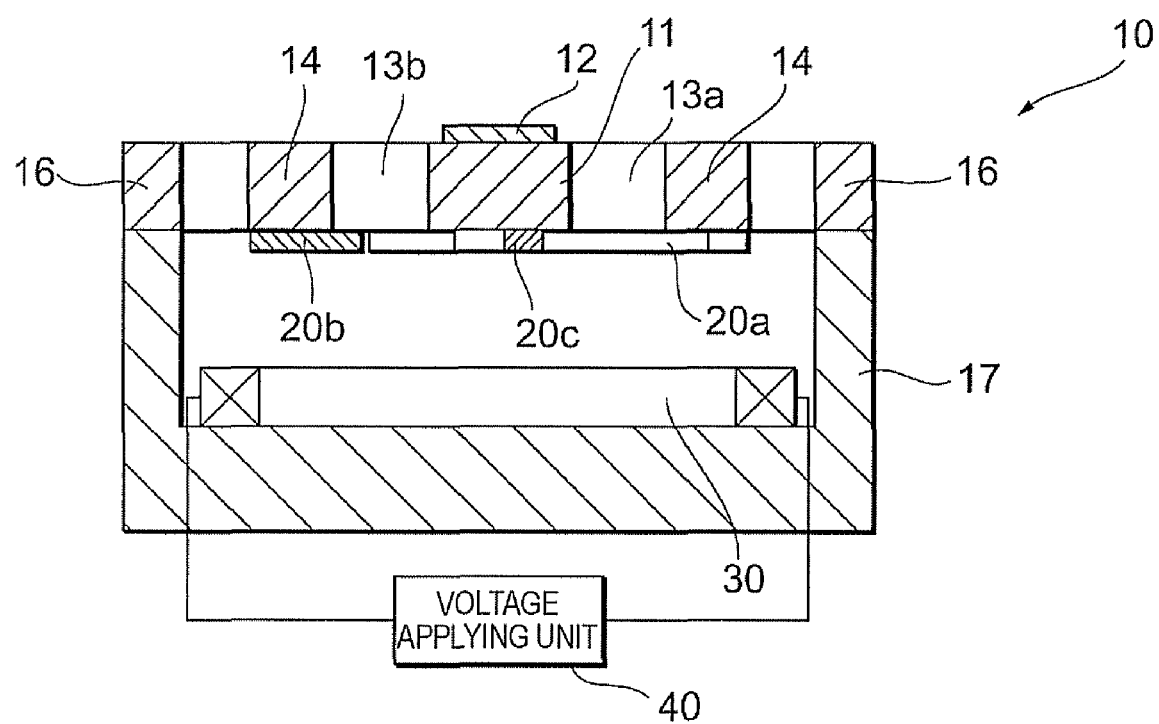
FIG. 3 is a sectional view taken on a line B-B of FIG. 1.
Figure 4:
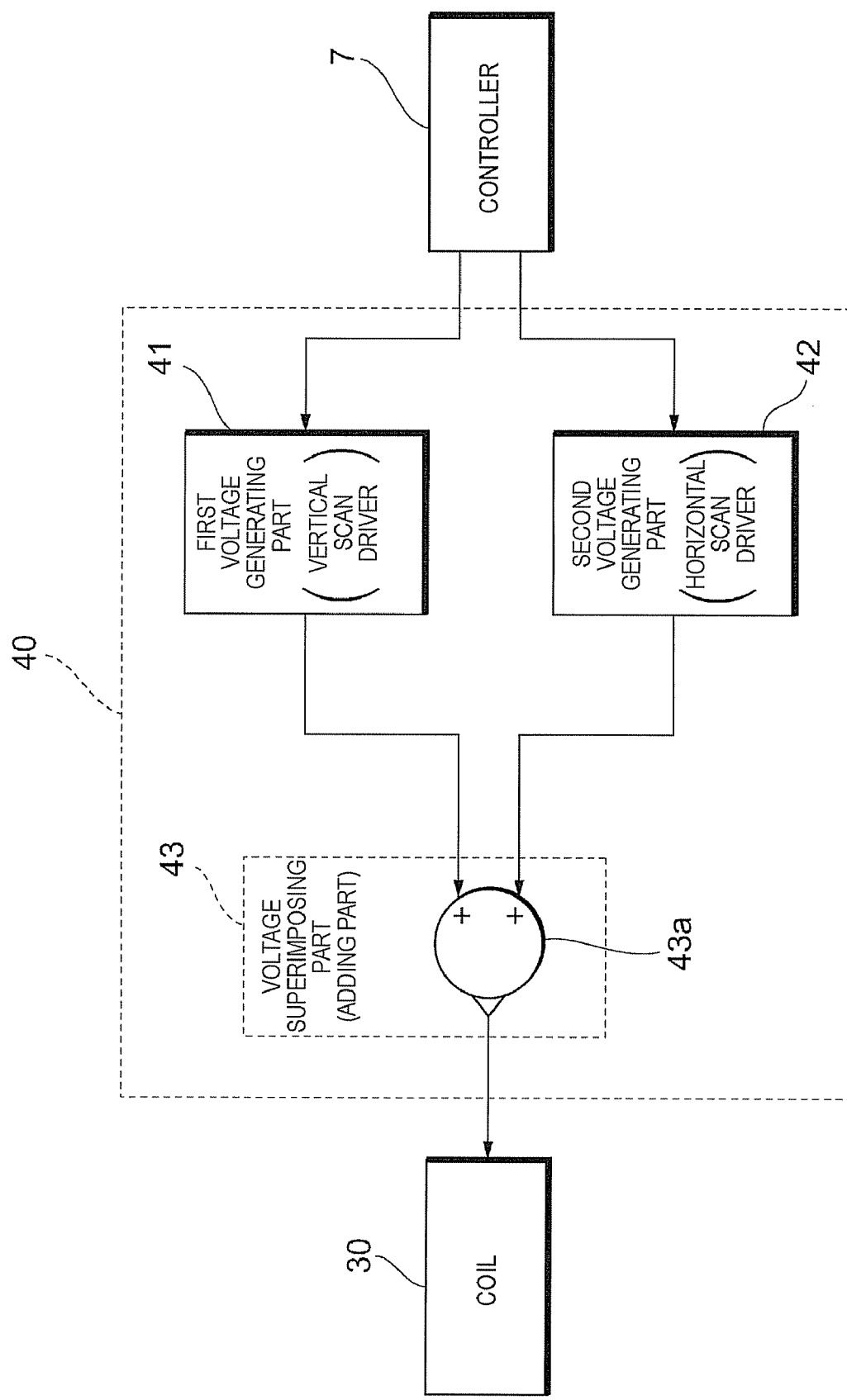
FIG. 4 is a block diagram showing a drive unit provided to the optical scanner shown in FIG. 1.
Figure 5A:
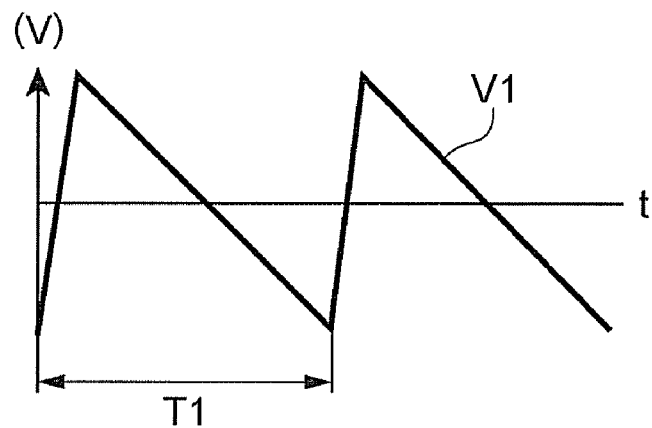
FIG. 5A shows an example of a voltage generated at a first voltage generating part shown in FIG. 4.
Figure 5B:
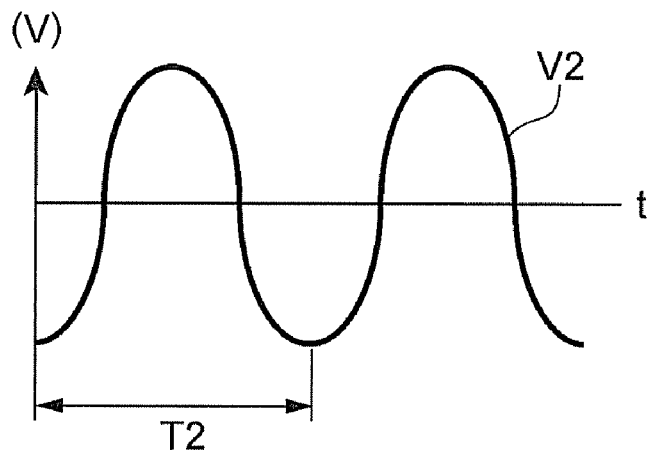
FIG. 5B shows an example of a voltage generated at a second voltage generating part shown in FIG. 4.

FIG. 1 is a plan view (also top view) showing the structure of an optical scanner (actuator) 10 according to the first embodiment the invention. FIG. 2 is a sectional view taken on a line A-A of FIG. 1. FIG. 3 is a sectional view taken on a line B-B of FIG. 1. FIG. 4 is a block diagram showing a drive unit provided to the optical scanner 10 shown in FIG. 1. FIG. 5A shows an example of a voltage generated at a first voltage generating part shown in FIG. 4. FIG. 5B shows an example of a voltage generated at a second voltage generating part shown in FIG. 4. For convenience sake, in FIG. 1, "right" in the description is used to indicate the right side, and "left" to indicate the left side. In FIG. 2, "on, upper" in the description are used to indicate the top side, "under, lower" to indicate the bottom side, "right" to indicate the right side, and "left" to indicate the left side.

With reference to FIGS. 1 through 3, the optical scanner 10 includes: a movable plate 11, a light reflection part 12, axis members (second axis members) 13a, 13b, a frame-shaped member 14, axis members (first axis members) 15a, 15b, a support frame 16, a holder 17, permanent magnets (first permanent magnets) 20a, 20b, a permanent magnet (second permanent magnet) 20c, a coil 30, and a voltage applying unit 40. The permanent magnets 20a, 20b, the movable plate 11 (light reflection part 12), the axis members 13a, 13b, the second permanent magnet 20c, the frame-shaped member 14, and the axis members 15a, 15b together constitute a first resonance system which uses the axis members 15a, 15b as a rotation axis. The second permanent magnet 20c, the movable plate 11 (light reflection part 12), the axis members 13a, 13b together constitute a second resonance system which uses the axis members 13a, 13b as a rotation axis. The light reflection part 12 is provided on the movable plate 11.

The frame-shaped member 14 is supported by the support frame 16 using the axis members 15a, 15b. The movable plate 11 is supported by the frame-shaped member 14 using the axis members 13a, 13b. The support frame 16 is supported by the holder 17. The shapes of the frame-shaped member 14 and the movable plate 11 are not limited to those illustrated in FIG. 1, so long as the frame-shaped member 14 has a shape of a frame, and so long as the movable plate 11 is provided within the frame-shaped member 14.

The axis members 13a, 13b and 15a, 15b is flexible and deformable. The axis members 15a, 15b join the frame-shaped member 14 to the support frame 16 so that the frame-shaped member 14 can rotate about an axis X (first axis) as shown in FIG. 1. The axis members 13a, 13b join the movable plate 11 to the frame-shaped member 14 so that the movable plate 11 can rotate about an axis Y (second axis) as shown in FIG. 1. The axes X, Y are orthogonal to each other. The center of the frame-shaped member 14 and the center of the movable plate 11 are located at an intersection of the axes X, Y in the planar view of FIG. 1.

By making the frame-shaped member 14 rotatable about the axis X and the movable plate 11 rotatable about the axis Y, the movable plate 11 can be rotated about two orthogonal axes X, Y.

The movable plate 11, the axis members 13a, 13b, the frame-shaped member 14, the axis members 15a, 15b, and the support frame 16 are integrally formed using, for example, silicon as the main material. By using silicon as the main material, excellent rotary characteristics and durability may be exhibited. Also, fine treatment (processing) becomes possible, thereby enabling miniaturization of the optical scanner 10. Alternatively, these elements may be fabricated using a substrate having a laminate structure such as a SOI substrate. In this case, in order to integrally form these movable plate 11, axis members 13a, 13b, frame-shaped member 14, axis members 15a, 15b, and support frame 16, it is preferred that they be fabricated into a single layer of a laminate substrate.

The holder 17 is mainly made of glass or silicon, for example. The holder 17 may take any configuration in so far as the holder 17 supports the support frame 16. The support frame 16 may be bonded to the holder 17 by any method, such as by using an adhesive agent or by anodic bonding. Alternatively, for example, a $SiO_2$ layer mainly made of $SiO_2$ may be interposed between the support frame 16 and the holder 17.

The permanent magnets 20a, 20b are provided to a lower surface of the frame-shaped member 14 (the surface facing the holder 17), and the permanent magnet 20c is provided to a lower surface of the movable plate 11 (opposite from a surface having the light reflection part 12). The coil 30 is provided to an upper surface of the holder 17. The coil 30 is electrically coupled to the voltage applying unit 40. The permanent magnets 20a, 20b, 20c, the coil 30, and the voltage applying unit 40 together constitute a drive unit for rotating the movable plate 11 and the frame-shaped member 14.

The permanent magnets 20a, 20b, 20c are disposed along a line segment that is inclined only at an angle of inclination θ (45 degrees in this case) to the axis X, in such a manner that the directions of the magnetic poles are identical. In other words, the line segment connecting the S pole of each of the permanent magnets 20a, 20b, 20c to the N pole thereof is inclined at the angle θ to the axis X.

The angle of inclination θ is preferably 30 to 60 degrees, more preferably 40 to 50 degrees, and even more preferably about 45 degrees. By providing the permanent magnets 20a, 20b, 20c in this manner, the movable plate 11 may be rotated about the axes X, Y very smoothly. In contrast, if the angle of inclination θ is less than 30 degrees, the movable plate 11 does not rotate smoothly on the axis X depending on, for example, the level of voltage applied to the voltage applying unit 40. On the other hand, if the angle of inclination θ exceeds 60 degrees, the movable plate 11 does not rotate about the axis Y depending on, for example, the level of voltage applied to the voltage applying unit 40.

Also, in the embodiment, one end of each of the permanent magnets 20a, 20b is located near a coupling portion coupling each of the axis members 13a, 13b with the frame-shaped member 14. Specifically, with reference to FIG. 1, an N pole end of the permanent magnet 20a is disposed near a coupling portion coupling the axis member 13a with the frame-shaped member 14, and an S pole end of the permanent magnet 20b is disposed near a coupling portion coupling the axis member 13b with the frame-shaped member 14.

The permanent magnets 20a, 20b are disposed satisfying L sin θ>0.5d, wherein L represents a length of the permanent magnets 20a, 20b in their magnetic pole direction, and d represents a length of the frame-shaped member 14 in a direction perpendicular to the axis X. In other words, the permanent magnets 20a, 20b are disposed such that both ends (magnetic poles) of each of the permanent magnets 20a, 20b are located in two regions divided by the axis X. The distance between the permanent magnets 20a and 20b is kept to such a distance that does not interfere with the rotation of the movable plate 11.

In the embodiment, although the permanent magnets 20a, 20b are provided to the lower surface of the frame-shaped member 14 (the surface facing the holder 17), they may be provided to an upper surface of the frame-shaped member 14 (the surface having the light reflection part 12). Alternatively, the magnets 20a, 20b may be provided to both upper and lower surfaces of the frame-shaped member 14.

The permanent magnet 20c is disposed such that the axes X, Y are interposed between both poles of the magnet 20c. Specifically, the permanent magnet 20c is disposed such that ends (magnetic poles) thereof are located in two regions divided by the axis X and, at the same time, in two regions divided by the axis Y.

An example of suitable substance for the permanent magnets 20a, 20b, 20c is a magnetized hard magnetic substance such as neodymium magnet, ferrite magnet, samarium-cobalt magnet, alnico magnet, or bond magnet. The permanent magnets 20a, 20b, 20c are made through magnetization of magnetic bodies that are bonded in advance to the frame-shaped member 14 and movable plate 11. This is because, if already-magnetized permanent magnets 20a, 20b, 20c are bonded to the frame-shaped member 14 and movable plate 11, these magnets are drawn to each other by the magnetic force, and the structures of the frame-shaped member 14 and movable plate 11 are destroyed by this force at the time of disposing the magnetized magnets on the frame-shaped member 14 and the movable plate 11.

Provided directly under the permanent magnets 20a, 20b, 20c is the coil 30. Specifically, the coil 30 is provided facing the lower surfaces of the movable plate 11 and the frame-shaped member 14. Thus, a magnetic field generated by the coil 30 can be exerted efficiently on the permanent magnets 20a, 20b, 20c. As a result, the optical scanner 10 may be made smaller and electricity-saving.

The coil 30 is electrically coupled to the voltage applying unit 40. Upon receipt of a voltage from the voltage applying unit 40, the coil 30 generates a magnetic field having a magnetic flux orthogonal to the axes X and Y. The coil 30 may be winded on a magnetic core.

Referring to FIG. 4, the voltage applying unit 40 includes: a first voltage generating part 41 that generates a first voltage V1 for rotating the movable plate 11 on the axis X, a second voltage generating part 42 that generates a second voltage V1 for rotating the movable plate 11 on the axis Y, and a voltage superimposing part 43 that superimposes the first and second voltages V1 and V2 and applies the superimposed voltage to the coil 30.

Referring to FIG. 5A, the first voltage generating part 41 generates the first voltage V1 (vertical scan voltage) that periodically changes at a period T1.

The first voltage V1 has a saw-like waveform. Therefore, the optical scanner 10 can vertically scan (sub scan) light beams effectively. The waveform of the first voltage V1 is not limited to this waveform. The frequency of the first voltage V1 (1/T1) is preferably, but not particularly limited to, 30 to 80 Hz (about 60 Hz), in so far as the frequency is suited for the vertical scan.

In this embodiment, the frequency of the first voltage V1 is adjusted so as to be different from a torsional resonance frequency of the first resonance system composed of the frame-shaped member 14 and the axis members 15a, 15b.

In contrast, with reference to FIG. 5B, the second voltage generating part 42 generates the second voltage V2 (horizontal scan voltage) that periodically changes at a period T2 that is different from the period T1.

The second voltage V2 has a sine wave like waveform. Therefore, the optical scanner 10 can main-scan light beams effectively. The waveform of the second voltage V2 is not limited to this waveform.

The frequency (second frequency) of the second voltage V2 is preferably higher than the frequency (first frequency) of the first voltage V1. That is, the period T2 is preferably shorter than the period T1. It is thereby possible to rotate the movable plate 11 on the axis X at the first frequency and on the axis Y at the second frequency at the same time.

The second frequency different from the first frequency is preferably 10 to 40 kHz but not particularly limited thereto in so far as the frequency is suited for the horizontal scan. Thus, by setting the frequency of the second voltage V2 to be 10 to 40 kHz and the frequency of the first voltage V1 to be about 60 Hz, the movable plate 11 can be rotated about both of the two orthogonal axes (axis X and axis Y) at the frequencies suitable for drawing on a display. However, combination of the frequencies of the second and first voltages V2 and V1 is not limited to this combination so long as the movable plate 11 is rotated about both axes X and Y.

In the embodiment, the second frequency is set to be equal to a torsional resonance frequency ($f_2$) of a second resonance system which is composed of the permanent magnet 20c, the movable plate 11, and the axis members 13a, 13b and which uses the axis members 13a, 13b as the rotation axis. In other words, the second resonance system is designed (manufactured) such that the torsional resonance frequency $f_2$ is suited for the horizontal scan. Accordingly, an angle of rotation of the movable plate 11 around the axis Y may be wide. Additionally, it is desirable to set the first frequency to be one tenth or less of a torsional resonance frequency ($f_1$) of the first resonance system which is composed of the permanent magnet 20c, the movable plate 11, the axis members 13a, 13b, the permanent magnets 20a, 20b, the frame-shaped member 14, and the axis members 15a, 15b and which uses the axis members 15a, 15b as the rotation axis. In order to drive the first resonance system in a non-resonant state (with an amplitude gain of 1), it is necessary to set the first frequency to be one tenth or less of $f_1$. This is because driving at a frequency higher than one tenth of $f_1$ may cause the first resonance system to resonate.

In contrast, it is desirable to set the second frequency to be ten times or higher than the first frequency in order to drive the first resonance system in the non-resonant state (with the amplitude gain of 1). If the second frequency is less than ten times higher than the first frequency, the first resonance system is also rotated upon application of the second voltage V2 to the coil 30, and a cross talk of drive signals occurs. As set forth, since it is desirable that the first frequency be one tenth or less of $f_1$, it is desirable that the second frequency be higher than the first frequency in this context.

If the resonance frequency of the first resonance system is $f_1$ [Hz], and the resonance frequency of the second resonance system is $f_2$ [Hz], then, it is desirable that $f_1$ and $f_2$ have a relationship satisfying $f_2 > f_1$, and more desirably $f_2 \geq 10\, f_1$. This makes it possible to rotate the movable plate 11 on the axis X at the first frequency of the first voltage and, simultaneously, on the axis Y at the second frequency of the second voltage. However, if $f_2 \leq f_1$, the first frequency may possibly cause the second resonance system to resonate.

These first and second voltage generating parts 41, 42 are individually coupled to a controller 7 and are driven based on signals from the controller 7. Coupled to these generating parts 41, 42 is the voltage superimposing part 43.

The voltage superimposing part 43 includes an adder 43a for applying voltage to the coil 30. Upon receipt of receipt of the first voltage V1 from the first generating part 41 and, simultaneously, of the second voltage V2 from the second generating part 42, the adder 43a superimposes these voltages and applies the superimposed voltage to the coil 30.

A method of driving the optical scanner 10 will now be described. In the embodiment, as described hereinbefore, the frequency of the first voltage V1 is set to be different from the torsional resonance frequency of the first resonance system, and the frequency of the second voltage V2 is set to be equal to the torsional resonance frequency of the second resonance system and, also, to be higher than the frequency of the first voltage V1 (for example, the frequency of the first voltage V1 is 60 Hz, and the frequency of the second voltage V2 is 15 kHz).

For example, the first voltage V1 as shown in FIG. 5A and the second voltage V2 as shown in FIG. 5B are superimposed by the voltage superimposing part 43, and the superimposed voltage is applied to the coil 30.

Then, with the first voltage V1, a magnetic field A1 and a magnetic field A2 are alternately shifted. The magnetic field A1 represents a magnetic field that attracts, to the coil 30, areas near bonded portions bonding the frame-shaped member 14 to the N poles of the permanent magnets 20a, 20b and that pulls away, from the coil 30, areas near bonded portions bonding the frame-shaped member 14 to the S poles of the permanent magnets 20a, 20b. The magnetic field A2 represents a magnetic field that pulls away, from the coil 30, the areas near the bonded portions bonding the frame-shaped member 14 to the N poles of the permanent magnets 20a, 20b and that attracts, to the coil 30, the areas near the bonded portions bonding the frame-shaped member 14 to the S poles of the permanent magnets 20a, 20b.

As described hereinbefore, the ends (magnetic poles) of each of the permanent magnets 20a, 20b are disposed in two regions divided by the axis X. Specifically, in the plan view of FIG. 1, the N poles of the permanent magnets 20a, 20b are located in one of the two regions divided by the axis X, and the S poles thereof are located in the other region. Therefore, by alternately shifting the magnetic fields A1 and A2 as described, the axis members 15a, 15b are twist-deformed, and simultaneously the frame-shaped member 14 is rotated along with the movable plate 11 on the axis X at the frequency of the first voltage V1. However, if both poles of each of the permanent magnets 20a, 20b are disposed in one of the two regions divided by the axis X, that is, if L sin θ is equal to or less than 0.5d, a rotational torque acting on the permanent magnets 20a, 20b by the magnetic fields A1 and A2 becomes a reverse-direction rotation force in the N pole side and the S pole side with respect to the axis X. Therefore, the rotational torque acting on the permanent magnets 20a, 20b decreases significantly as a whole, and the rotational efficiency of the frame-shaped member 14 and the movable plate 11 decreases.

The frequency of the first voltage V1 is set extremely lower than that of the second voltage V2. Also, the resonance frequency of the first resonance system is designed to be lower than the resonance frequency of the second resonance system (for example, 1/10 or less of the resonance frequency of the second resonance system). In other words, the first resonance system is designed to resonate more readily than the second resonance system, and accordingly the first resonance system rotates on the axis X by the first voltage V1. This means that the second voltage V2 can prevent the frame-shaped member 14 from rotating on the axis X.

In contrast, with the second voltage V2, a magnetic field B1 and a magnetic field B2 are alternately shifted. The magnetic field B1 represents a magnetic field that attracts, to the coil 30, the areas near the bonded portions bonding the frame-shaped member 14 to the N poles of the permanent magnets 20a, 20b and, also, an area near a bonded portion bonding the movable plate 11 to the N pole of the permanent magnet 20c, and that pulls away, from the coil 30, the areas near the bonded portions bonding the frame-shaped member 14 to the S poles of the permanent magnets 20a, 20b and, also, an area near the bonded portion bonding the movable plate 11 to the S pole of the permanent magnet 20c. The magnetic field B2 represents a magnetic field that pulls away, from the coil 30, the areas near the bonded portions bonding the frame-shaped member 14 to the N poles of the permanent magnets 20a, 20b and, also, the area near the bonded portion bonding the movable plate 11 to the N pole of the permanent magnet 20c, and that attracts, to the coil 30, the areas near the bonded portions bonding the frame-shaped member 14 to the S poles of the permanent magnets 20a, 20b and, also, the area near the bonded portion bonding the movable plate 11 to the S pole of the permanent magnet 20c.

As described earlier, one ends of the permanent magnets 20a, 20b are located near the coupling portions coupling the axis members 13a, 13b with the frame-shaped member 14. Specifically, the N pole of the permanent magnet 20a and the S pole of the permanent magnets 20b are located on the axis Y; the S pole of the permanent magnet 20a is located in one of the two regions divided by the axis Y; and the N pole of the permanent magnet 20b is located in the other region. Also, the permanent magnet 20c is disposed interposing the axis Y between both poles thereof. Accordingly, by the alternate shifting of the magnetic fields B1 and B2, the axis members 13a, 13b are twist-deformed, and the movable plate 11 is at the same time rotated about the axis Y at the frequency of the second voltage V2.

The frequency of the second voltage V2 is equal to the torsional resonance frequency of the second resonance system. Therefore, the movable plate 11 can be rotated about the axis Y by the second voltage V2. In other words, the first voltage V1 prevents the movable plate 11 from rotating on the axis Y.

As set forth, according to the embodiment, through application of the voltage obtained by superimposing the first and second voltages V1 and V2, the movable plate 11 is rotated about the axis X at the frequency of the first voltage V1 and, at the same time, about the axis Y at the frequency of the second voltage V2. Therefore, it is possible to rotate the movable plate 11 on both axes X and Y while reducing the costs and size of the apparatus. Also, because the permanent magnets 20a, 20b, 20c are provided, a large drive force is attained with a fewer number of coils even though the structure is small and simple. Accordingly, it is possible to increase the scan angle of the resonance systems and to perform high-speed scan at the same time. Moreover, because one ends of the permanent magnets 20a, 20b are located near the coupling portions coupling the axis members 13a, 13b with the frame-shaped member 14, that is, because one ends of both permanent magnets 20a, 20b are located on the axis Y, the magnetic pair of the permanent magnets 20a, 20b has the longest effective length with respect to the direction along the axis X of the frame-shaped member 14. Accordingly, a weak resonance of the second frequency on the axis Y occurs efficiently to the frame-shaped member 14 by the second frequency of the second voltage V2, and this weak resonance equal to the torsional resonance frequency of the second resonance system enables resonance rotation of the movable plate 11 on the axis Y. In addition, because the permanent magnet 20c is disposed on the movable plate 11, and both poles of the magnet 20c are disposed interposing the axis Y, it is possible to acquire a direct and strong drive force for the resonance rotation of the movable plate 11 on the axis Y. Therefore, since two drive forces are exerted on the second resonance system, the scan angle of the resonance system increases and, at the same time, the high-speed scanning becomes possible.

Also, by suitably changing the first voltage V1 and the second voltage V2, desired resonance characteristics may be attained without changing the constitutions of the first and second resonance systems.

Additionally, in the optical scanner 10, the permanent magnets 20a, 20b are provided on the frame-shaped member 14, and the coil 30 is provided on the holder 17 so as to face the permanent magnets 20a, 20b. This means that the coil 30 which is a heating element is not provided on the first and second resonance systems. Therefore, it is possible to suppress deflection of the resonance systems caused by the heat emitted from the coil 30 during application of current and to suppress changes in the resonance frequencies. As a result, the optical scanner 10 exhibits the desired resonance characteristics even after a prolonged use.

Furthermore, because the magnetic bodies of the permanent magnets 20a, 20b, 20c are magnetized after being disposed in parallel to the frame-shaped member 14 so as to have the same magnetic direction, there is not a problem of destroying the frame-shaped member 14 caused by the movement of the magnetic bodies in a direction of stronger magnetism within a magnetizing apparatus.

Image Forming Apparatus

Figure 6:
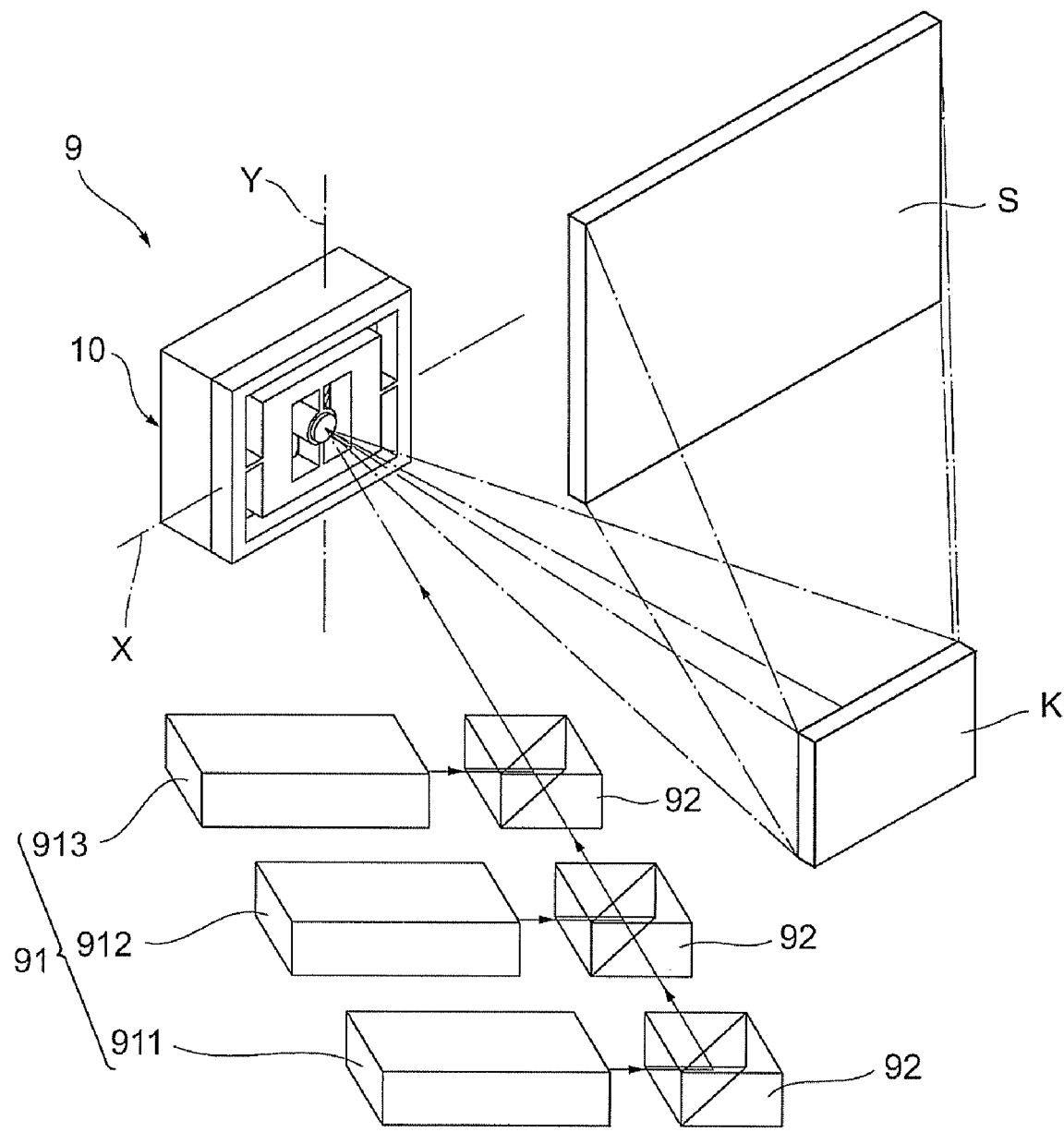
FIG. 6 is a schematic view showing an example of an image forming apparatus according to the invention.

FIG. 6 shows an example of the image forming apparatus according to the invention, using the optical scanner 10 as the optical scanner of an imaging display. A longitudinal direction of a screen S is called "lateral direction," and a direction orthogonal to the longitudinal direction is called "vertical direction." A rotational center axis X is parallel to the lateral direction of the screen S, and a rotational center axis Y is parallel to the vertical direction of the screen S.

An image forming apparatus (projector) 9 includes a light source device 91 that emits light such as laser, a plurality of dichroic mirrors 92, 92, 92, and the optical scanner 10.

The light source device 91 includes a red light source unit 911 emitting red light, a blue light source unit 912 emitting blue light, and a green light source unit 913 emitting green light.

Each dichroic mirror 92 is an optical element that synthesizes light beams emitted from the red, blue, green light source units 911, 912, 913.

In the projector 9 such as this, the dichroic mirrors 92 synthesize the light beams emitted from the light source device 91 (red, blue, green light source units 911, 912, 913) based on image information from a host computer (not shown). Then, the optical scanner 10 two-dimensionally scans the synthesized light beams, and color images are formed on the screen S.

In the two-dimensional scanning, a movable plate 221 of the optical scanner 10 is rotated about the rotational center axis Y so as to scan (main scan) light beams reflected by a light reflecting part 221*a* in the lateral direction of the screen S. In contrast, the movable plate 221 of the optical scanner 10 is rotated about the rotational center axis X so as to scan (sub scan) light beams reflected by the light reflecting part 221*a* in the vertical direction of the screen S.

Referring to FIG. 6, after two-dimensionally scanning the light beams synthesized by the dichroic mirrors 92, the synthesized light beams are reflected on a fixed mirror K, and then the images are formed on the screen S. However, the fixed mirror X may be omitted, and the light beams that are two-dimensionally scanned by the optical scanner 10 may be irradiated directly on the screen S.

The actuator, the optical scanner, and the image forming apparatus according to the invention have now been described as set forth based on the illustrated embodiments. However, the invention is not limited to these embodiments. For example, each constitutional element in the actuator, optical scanner, and image forming apparatus according to the invention may be substituted for any other structure having the same performance and/or may have any additional structures.

The entire disclosure of Japanese Patent Application No. 2009-167625, filed Jul. 16, 2009 is expressly incorporated by reference herein.

What is claimed is:

1. An actuator, comprising:
a frame-shaped member;
a pair of first axis members, each of the first axis members being provided at one of corresponding ends of the frame-shaped member in a direction along a first axis so as to make the frame-shaped member rotatable about the first axis;
a movable plate provided within the frame-shaped member;
a pair of second axis members supporting the movable plate against the frame-shaped member, each of the second axis members being provided at one of corresponding ends of the movable plate in a direction along a second axis so as to make the movable plate rotatable about the second axis that is orthogonal to the first axis;
at least two first permanent magnets provided to the frame-shaped member such that the first axis is interposed between both poles of each of the first permanent magnets;
a second permanent magnet provided to the movable plate such that the first axis is interposed between both poles of the second permanent magnet;
a coil facing the frame-shaped member and generating a magnetic force that acts on the first and second permanent magnets upon receipt of a voltage; and
a voltage applying unit applying the voltage to the coil, wherein:
each of the first permanent magnets and the second permanent magnet are disposed so as to have an angle θ of 30<θ<60 degrees to the first axis and are disposed such that magnetic pole directions of the first and second permanent magnets are identical;
the voltage applying unit includes a first voltage generating part generating a first voltage of a first frequency, a second voltage generating part generating a second voltage of a second frequency different from the first frequency, and a voltage superimposing part superimposing the first and second voltages; and
the movable plate is rotated about the first axis at the first frequency and about the second axis at the second frequency by application of a voltage superimposed by the voltage superimposing part to the coil.

2. The actuator according to claim 1, wherein
one end of the first permanent magnet is disposed at a coupling portion coupling the second axis member with the frame-shaped member.

3. The actuator according to claim 1, wherein
the second permanent magnet is disposed such that the second axis is interposed between both poles of the second permanent magnet.

4. The actuator according to claim 1, wherein:
L sin θ>0.5d; and
L represents a length of the first permanent magnets in a magnetic pole direction, and d represents a length of the frame-shaped member in a direction perpendicular to the first axis.

5. The actuator according to claim 1, wherein:
the second frequency is substantially equal to a resonance frequency of a second resonance system that includes the second permanent magnet, the movable plate, and the pair of second axis members and that uses the second axis members as a second rotation axis; and
the first frequency is different from a resonance frequency of a first resonance system that includes the second permanent magnet, the movable plate, the pair of second axis members, the first permanent magnets, the frame-shaped member, and the pair of first axis members and that uses the first axis members as a first rotation axis.

6. The actuator according to claim 1, wherein:
the second frequency is higher than the first frequency.

7. An optical scanner, comprising:
a frame-shaped member;
a pair of first axis members, each of the first axis members being provided at one of corresponding ends of the frame-shaped member in a direction along a first axis of the frame-shaped member so as to make the frame-shaped member rotatable about the first axis;
a movable plate provided within the frame-shaped member and including a light reflection part having light reflectivity;
a pair of second axis members supporting the movable plate against the frame-shaped member, each of the second axis members being provided at one of corresponding ends of the movable plate in a direction along a second axis so as to make the movable plate rotatable about the second axis that is orthogonal to the first axis;
at least two first permanent magnets provided to the frame-shaped member such that the first axis is interposed between both poles of each of the first permanent magnets;

a second permanent magnet provided to the movable plate such that the first axis is interposed between both poles of the second permanent magnet;

a coil facing the frame-shaped member and generating a magnetic force that acts on the first and second permanent magnets upon receipt of a voltage; and a voltage applying unit applying the voltage to the coil, wherein:

each of the first permanent magnets and the second permanent magnet are disposed so as to have an angle θ of 30<θ<60 degrees to the first axis and are disposed such that magnetic pole directions of the first and second permanent magnets are identical;

the voltage applying unit includes a first voltage generating part generating a first voltage of a first frequency, a second voltage generating part generating a second voltage of a second frequency different from the first frequency, and a voltage superimposing part superimposing the first and second voltages; and the movable plate is rotated about the first axis at the first frequency and about the second axis at the second frequency by application of a voltage superimposed by the voltage superimposing part to the coil.

8. An image forming apparatus, comprising:

the optical scanner according to claim 7, wherein the movable plate is rotated so as to perform two-dimensional scanning of light reflected by the light reflection part and to form an image on an object.

\* \* \* \* \*